(12) United States Patent
Li

(10) Patent No.: US 11,289,989 B2
(45) Date of Patent: Mar. 29, 2022

(54) MINIATURE DIRECT CURRENT MOTOR

(71) Applicant: DONGGUAN LEBOND ELECTRONIC TECHNOLOGY CO., LTD., Dongguan (CN)

(72) Inventor: Jinzhi Li, Dongguan (CN)

(73) Assignee: DONGGUAN LEBOND ELECTRONIC TECHNOLOGY CO., LTD., Dongguan (CN)

( * ) Notice: Subject to any disclaimer, the term of this patent is extended or adjusted under 35 U.S.C. 154(b) by 194 days.

(21) Appl. No.: 16/819,193

(22) Filed: Mar. 16, 2020

(65) Prior Publication Data

US 2020/0220443 A1 Jul. 9, 2020

Related U.S. Application Data

(63) Continuation of application No. PCT/CN2017/115885, filed on Dec. 13, 2017.

(30) Foreign Application Priority Data

Sep. 21, 2017 (CN) .......................... 201710862066.5

(51) Int. Cl.
*H02K 33/16* (2006.01)
*A46B 13/02* (2006.01)
(Continued)

(52) U.S. Cl.
CPC ............. *H02K 33/16* (2013.01); *A46B 13/02* (2013.01); *H02K 7/083* (2013.01); *A61C 17/22* (2013.01)

(58) Field of Classification Search
CPC ........ H02K 33/16; H02K 7/083; A46B 13/02; A61C 17/22
(Continued)

(56) References Cited

U.S. PATENT DOCUMENTS

| 6,876,116 B2* | 4/2005 | Nakano .................. H02K 21/12 |
| | | 310/156.47 |
| 9,072,576 B2* | 7/2015 | Nishiura ................ H02K 33/12 |
| 2002/0084707 A1 | 7/2002 | Tang |

FOREIGN PATENT DOCUMENTS

| CN | 101554342 U | 10/2009 |
| CN | 203815640 U | 9/2014 |

(Continued)

OTHER PUBLICATIONS

Internation Search Report of PCT/CN2017/115885, dated Jun. 29, 2018.

*Primary Examiner* — Terrance L Kenerly
(74) *Attorney, Agent, or Firm* — True Shepherd LLC; Andrew C. Cheng

(57) ABSTRACT

A miniature direct-current motor comprises a bottom cover, a receiving seat, a housing mounted on the receiving seat, a support frame mounted in the housing, four permanent magnets and coils mounted on the support frame, an output shaft mounted on the receiving seat and extending out of the housing and an iron core mounted on the output shat. Every two permanent magnets constitute one group and are symmetrically located on the side surface of the support frame, and an included angle formed by connection lines between the centers of two permanent magnets located on the same side surface of the support frame and the axis of the output shaft is 50°~60°. The iron core includes a sleeve portion sleeved on the output shaft and swing arms symmetrically arranged at two sides of the sleeve portion, and the swing arms are arranged opposite to the permanent magnets.

8 Claims, 7 Drawing Sheets

(51) Int. Cl.
*H02K 7/08* (2006.01)
*A61C 17/22* (2006.01)

(58) Field of Classification Search
USPC .................................................. 310/17, 81
See application file for complete search history.

(56) References Cited

FOREIGN PATENT DOCUMENTS

| | | | | |
|---|---|---|---|---|
| CN | 206499540 U | 11/2015 | | |
| CN | 205657574 U | 10/2016 | | |
| CN | 107394982 A | 11/2017 | | |
| CN | 207234641 U | 4/2018 | | |
| EP | 2262084 A1 * | 12/2010 | ............. | H02K 16/02 |

* cited by examiner

MINIATURE DIRECT CURRENT MOTOR

CROSS-REFERENCE TO RELATED APPLICATIONS

This application is a continuation of International Patent Application No. PCT/CN2017/115885 with a filing date of Dec. 13, 2017, designating the United States, now pending, and further claims priority to Chinese Patent Application No. 201710862066.5 with a filing date of Sep. 21, 2017. The content of the aforementioned applications, including any intervening amendments thereto, are incorporated herein by reference.

TECHNICAL FIELD

The disclosure relates to the technical field of electric toothbrush accessories, and particularly to a miniature direct-current motor.

BACKGROUND OF THE PRESENT INVENTION

With the continuous development of society and the increasing improvement of living standards, electric toothbrushes have become more and more popular with people. The electric toothbrush mainly consists of a rechargeable battery, a miniature direct-current motor, a battery box, a toothbrush head, a metal guard plate and a sleeve. Compared with the traditional manual toothbrush, the toothbrush head of the electric toothbrush moves at the speed of thousands of times or even tens of thousands of times per minute under the drive of electric power, and the vibration efficiency is much higher than that of the manual toothbrush. There are two miniature direct-current motors for realizing the vibration of the electric toothbrush. One is that a direct-current rotating motor and an eccentric wheel form a vibration motor. The other is that the motor swings left and right through the control of a converter on the circuit. The rebound structure of the spring is connected in the middle of the power shaft to ensure that insufficient drive force can be made up in the neutral position occurring when circuit switching. The above two motors are more complex in structure, higher in preparation cost, and larger in friction noise when in operating and running.

SUMMARY OF PRESENT INVENTION

Based on this, it is necessary to provide a miniature direct-current motor that is simple in structure and small in nose, with respect to the problems existing in the motor of the electric toothbrush.

Provided is a miniature direct-current motor, including a bottom cover, a receiving seat, a housing mounted on the receiving seat, a support frame mounted in the housing, four permanent magnets and coils mounted on the support frame, an output shaft mounted on the receiving seat and extending out of the housing and an iron core mounted on the output shaft, wherein every two permanent magnets constitute one group and are symmetrically located on the side surface of the support frame, an included angle formed by connection lines between the centers of two permanent magnets located on the same side surface of the support frame and the axis of the output shaft is 50°~60°; the iron core includes a sleeve portion sleeved on the output shaft and swing arms symmetrically arranged at two sides of the sleeve portion, and the swing arms are arranged opposite to the permanent magnets.

The above miniature direct-current motor includes a bottom cover, a receiving seat, a housing mounted on the receiving seat, a support frame mounted in the housing, four permanent magnets and coils mounted on the support frame, an output shaft mounted on the receiving seat and extending out of the housing and an iron core mounted on the output shaft. When in use, by alternatively changing the current direction of the coil, the iron core becomes a field core under the action of a magnetic field after electrification, the iron core swings left and right under the magnetic field action of the permanent magnet so as to drive the left and right swing of the output shaft. Since the included angle formed by connection lines between the centers of two permanent magnets located on the same side surface of the support frame and the axis of the output shaft id 50°~60°, according to cosine law, the permanent magnet is large in generating assisted force, enough in stress stroke and large in swing amplitude. It is unnecessary to make up for insufficient drive force in the neutral position when circuit switching with the help of a reset spring during a time gap for change in current direction. The miniature direct-current motor is simple in structure and small in noise.

In one of embodiments, a lower bearing and an upper bearing are mounted on the output shaft, the lower bearing is located on the receiving seat, and the upper bearing is located on the housing.

In one of embodiments, the receiving seat is provided with a first bearing groove and two slots, the first bearing groove accommodates the lower bearing, and the two slots extend toward the bottom cover.

In one of embodiments, two fixture blocks are protruded from the bottom cover, and the fixture blocks are adaptive to the slots in one-to-one correspondence.

In one of embodiments, two arc-shaped blocks are protruded from the receiving seat, and the arc-shaped blocks are abutted against the inner wall of the housing.

In one of embodiments, the outgoing head of the coil penetrates out from the bottom cover.

In one of embodiments, the swing arm is provided with an arc-shaped groove and two stress faces, the two stress faces are symmetrically located at two sides of the arc-shaped groove and arranged in one-to-one correspondence to the permanent magnets.

In one of embodiments, the support frame includes a first frame body and a second frame body, and one ends of the first frame body and the second frame body are abutted against the receiving seat.

In one of embodiments, the first frame body is provided with first mounting grooves and first coil wrapping grooves, and the first mounting grooves longitudinally extend to accommodate the permanent magnets.

In one of embodiments, the second frame body is provided with second mounting grooves and second coil wrapping grooves, the second mounting grooves longitudinally extend to accommodate the permanent magnets and are in one-to-one correspondence to the first mounting grooves, and the second coil wrapping grooves transversely extend to accommodate the coils and are in one-to-one correspondence to the first coil wrapping grooves.

DESCRIPTION OF THE DRAWINGS

FIG. 1 is a diagram of an iron core of a miniature direct-current motor shown in FIG. 2.

Figure 1:
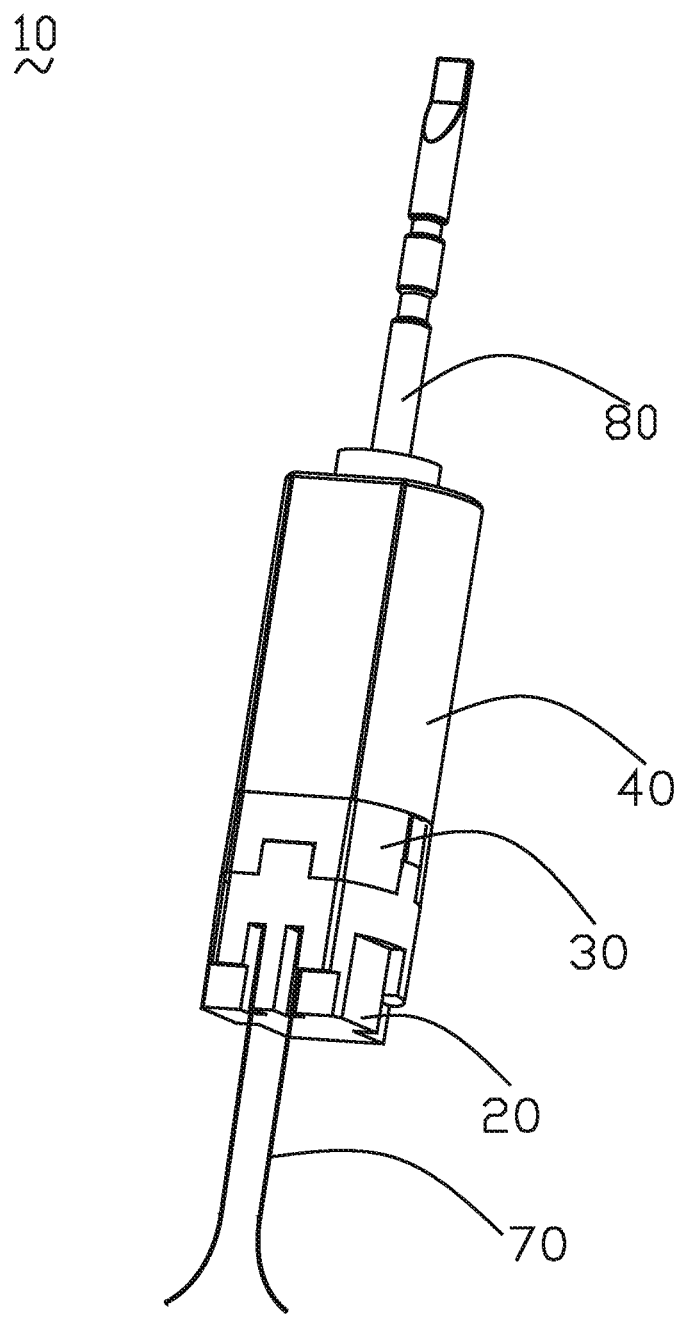
FIG. 1 is a diagram of a miniature direct-current motor according to a preferred embodiment of the disclosure.

Reference numbers: 10—miniature direct—current motor, 20—bottom cover, 21—fixture block, 30—receiving seat, 31—first bearing groove, 32—slot, 33—arc—shaped block, 40—housing, 41—second bearing groove, 50—support frame, 51—first frame body. 52—second frame body, 53—first mounting groove, 54—first coil wrapping groove, 55—second coil wrapping groove, 60—permanent magnet, 70—coil 80—output shaft, 81—lower bearing, 82—upper bearing, 90—iron core, 91—sleeve portion, 92—swing arm, 93—arc—shaped groove, and 94—stress face

DETAILED DESCRIPTION OF PREFERRED EMBODIMENTS

In order to facilitate the understanding of the disclosure, the disclosure will be more comprehensively described with reference to relevant drawings. Preferred embodiments of the disclosure are given in the drawings. However, the disclosure can be implemented in many different forms, and is not limited to the embodiments described herein. On the contrary, the purpose of providing these embodiments is to make the understanding of the disclosure of the disclosure more thorough and comprehensive.

It should be noted that when an element is called "fixed" to another element, it can be directly present on another element or a middle element may be present. When one element is considered as "connect" another element, it can be directly connected to another component or a middle element may be present at the same time.

Unless otherwise defined, all technical and scientific terms used herein have the same meanings as those generally understood by those skilled in the art of the invention. The terms used in the description of the disclosure are only for describing embodiments, but not to limit the disclosure.

Referring to FIG. 1-FIG. 11, as a preferred embodiment of the disclosure, a miniature direct-current motor 10 is mainly used for an electric toothbrush as the power source of the electric toothbrush. The miniature direct-current motor 10 includes a bottom cover 21, a receiving seat 30 mounted on the bottom cover 20, a housing 40 mounted on the receiving seat 30, a support frame 50 mounted in the housing 40, four permanent magnets 60 and coils 70 mounted on the support frame 50, an output shaft 80 mounted on the receiving seat 30 and extending out of the housing 40 and an iron core 90 mounted on the output shaft 80. The outgoing head of the coil 70 penetrates out from the bottom cover 20. When in use, the current direction of the coil is alternatively changed, the iron core 90 swings under the action of the permanent magnet 60, so that the output shaft 80 continuously swings. Where, every two permanent magnets 60 constitute one group and are symmetrically located on the side surface of the support frame 50, an included angle formed by connection lines between the centers of two permanent magnets 60 located on the same side surface of the support frame 50 and the axis of the output shaft 80 is 50°~60°.

Figure 2:
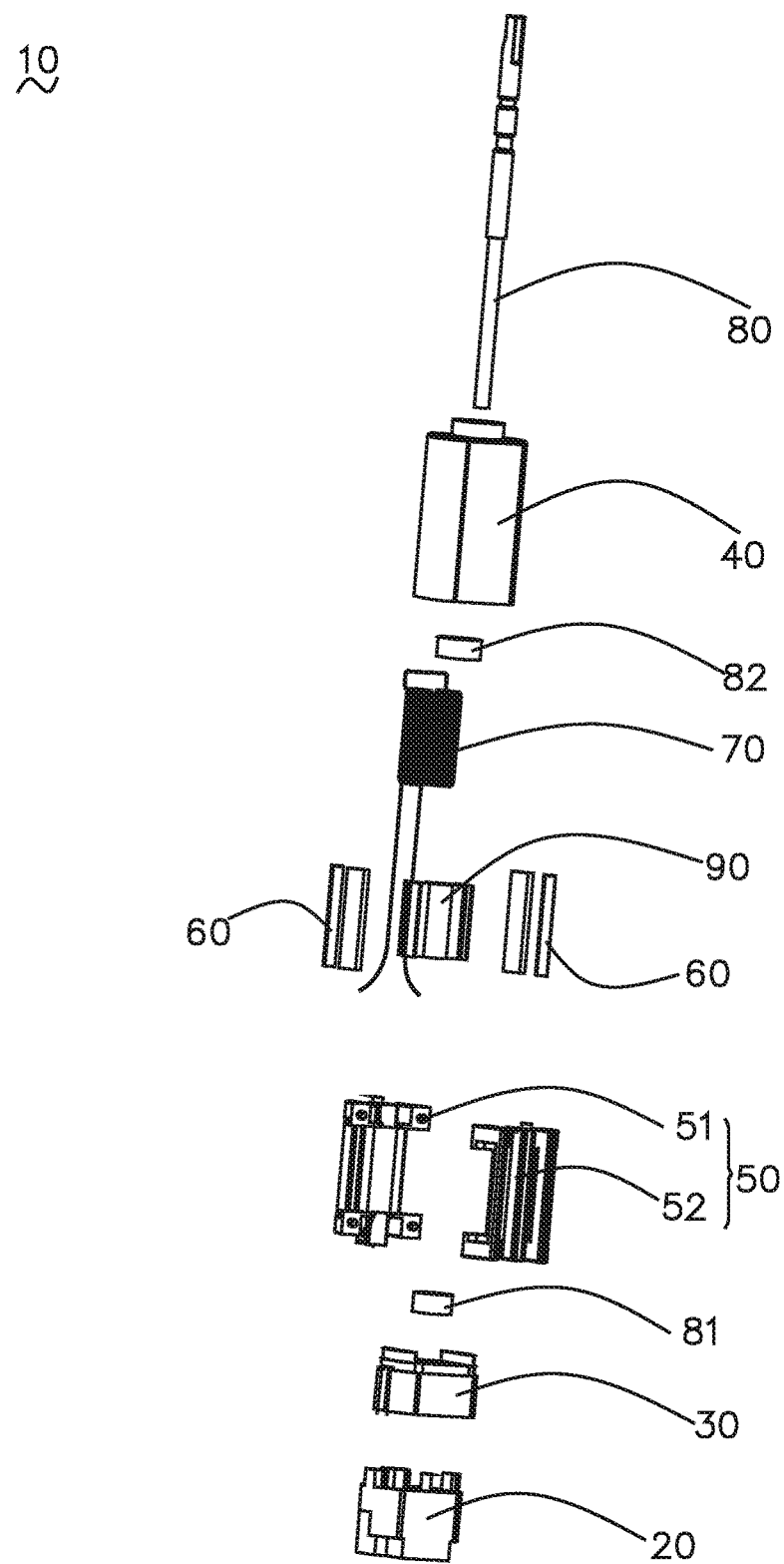
FIG. 2 is an exploded view of a miniature direct-current motor shown in FIG. 1.
Figure 3:
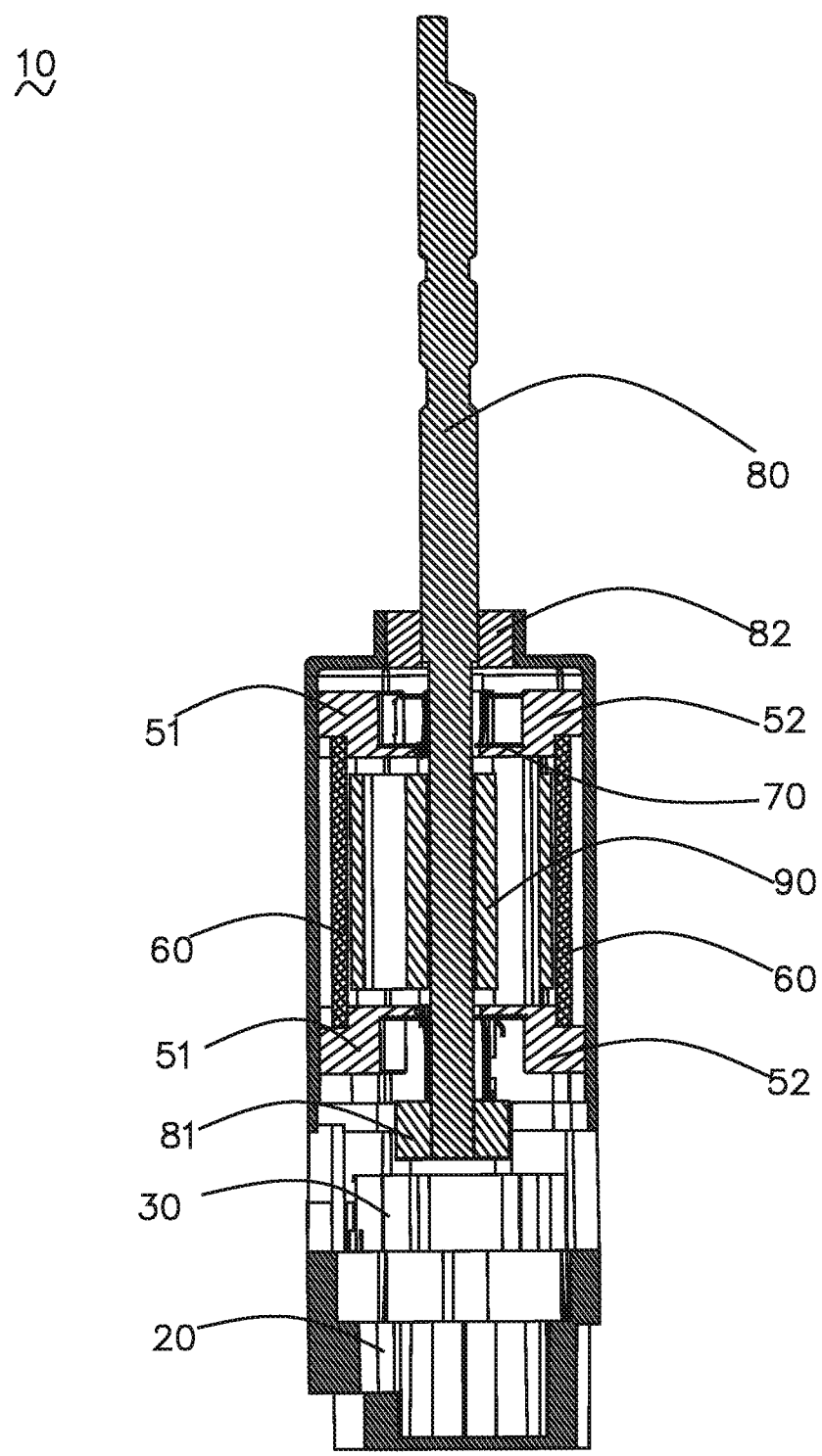
FIG. 3 is a sectional view of a miniature direct-current motor shown in FIG. 1.
Figure 4:
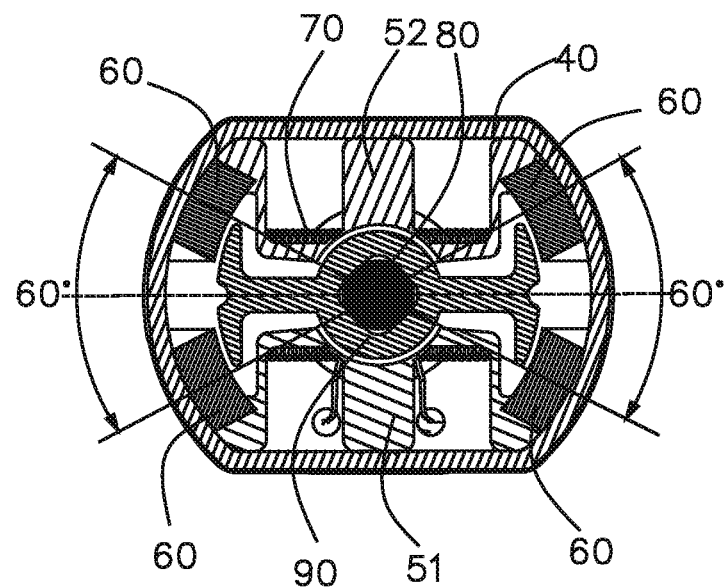
FIG. 4 is another sectional view of a miniature direct-current motor shown in FIG. 1.
Figure 5:
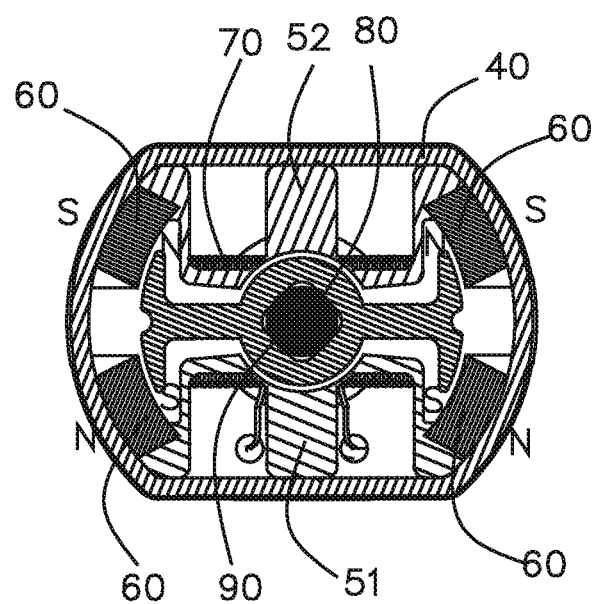
FIG. 5 is another sectional view of a miniature direct-current motor shown in FIG. 4.
Figure 6:
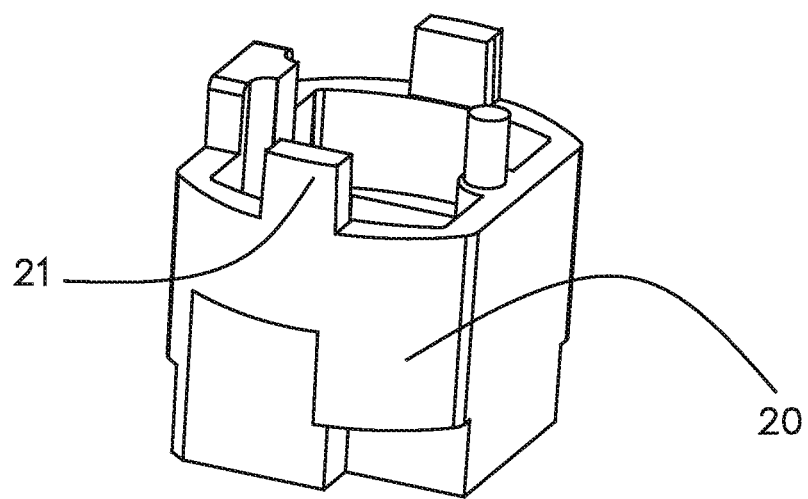
FIG. 6 is a diagram of a bottom cover of a miniature direct-current motor shown in FIG. 2.
Figure 7:
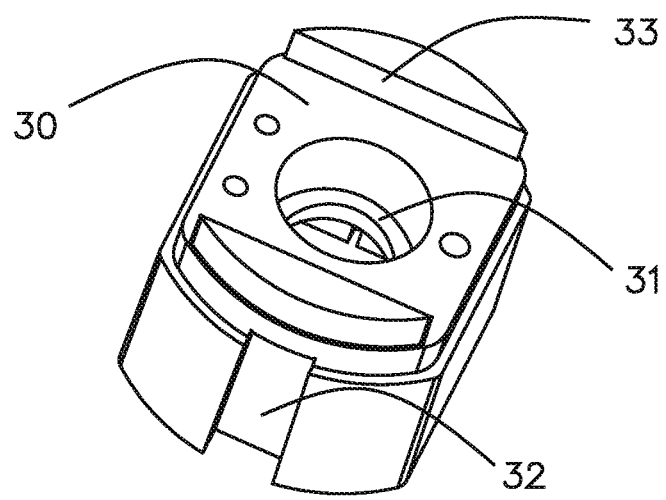
FIG. 7 is a diagram of a receiving seat of a miniature direct-current motor shown in FIG. 2.
Figure 8:
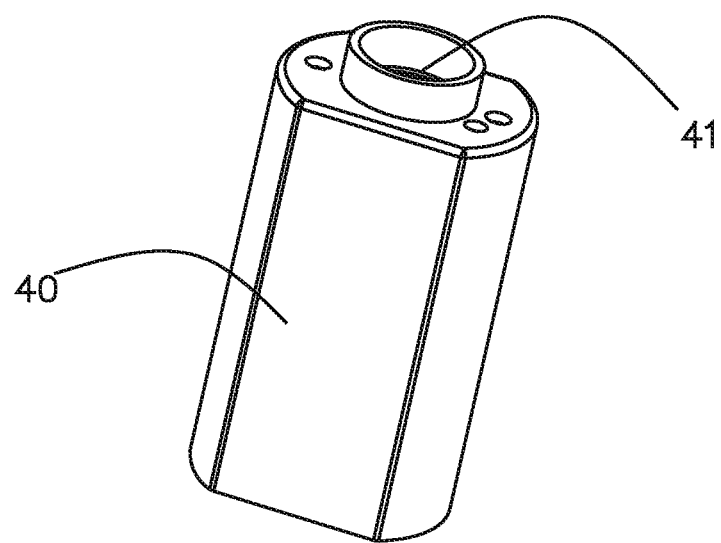
FIG. 8 is a diagram of a housing of a miniature direct-current motor shown in FIG. 2.
Figure 9:
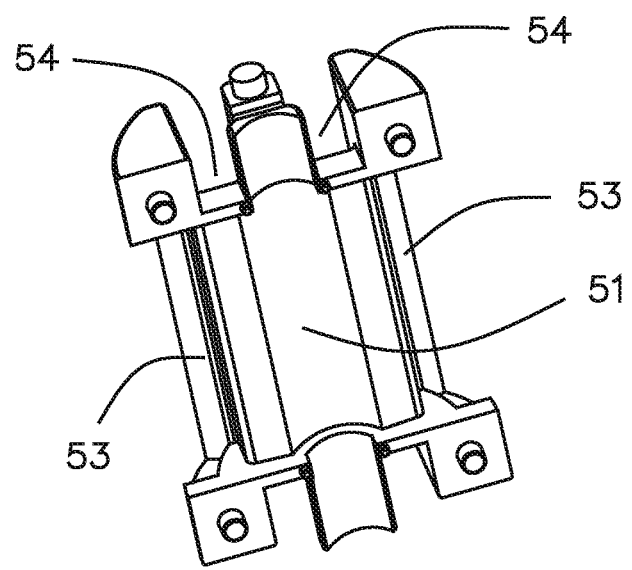
FIG. 9 is a diagram of a first frame body of a miniature direct-current motor shown in FIG. 2.
Figure 10:
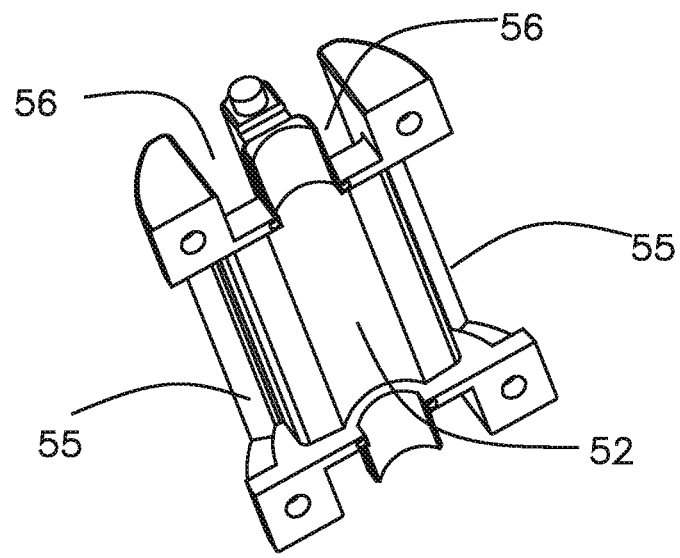
FIG. 10 is a diagram of a second frame body of a miniature direct-current motor shown in FIG. 2.

Further, referring to FIG. 2 and FIG. 6, two fixture blocks 21 are protruded from the bottom cover 20, and the fixture blocks 21 are clamped with the receiving seat 30, and the bottom cover 20 takes the effect of protecting the receiving seat 30. Referring to FIG. 7 again, the receiving seat 30 is provided with a first bearing groove 31 and two slots 32, the first bearing groove 31 accommodates one end of the output shaft 80, the slots 32 extend toward the bottom cover 20, and the slots 32 are adaptive to the fixture blocks 21 in one-to-one correspondence. More further, two arc-shaped blocks 33 are protruded from the receiving seat 30, and the arc-shaped blocks 33 are abutted against the inner wall of the housing 40 to prevent the receiving seat 30 from randomly rotating.

Further, referring to FIG. 8 again, the housing 40 is provided with a second bearing groove 41, and the second bearing groove 41 is located the end of the housing 40 far away from the bottom cover 20. Further, referring FIG. 9 and FIG. 10 again, the support frame 50 includes a first frame body 51 and a second frame body 52, and one ends of the first frame body 51 and the second frame body 52 are abutted against the receiving seat 30. The first frame body 51 is provided with first mounting grooves 53 and first coil wrapping grooves 54, and the first mounting grooves 53 longitudinally extend to accommodate the permanent magnets 60, and the first coil wrapping grooves 54 transversely extend to accommodate the coils 70. The second frame body 52 is provided with second mounting grooves 55 and second coil wrapping grooves 56, the second mounting grooves 55 longitudinally extend to accommodate the permanent magnets 60 and are in one-to-one correspondence to the first mounting grooves 53, and the second coil wrapping grooves 56 transversely extend to accommodate the coils 70 and are in one-to-one correspondence to the first coil wrapping grooves 54. More further, referring to FIG. 4 and FIG. 5, two permanent magnets 60 are mounted on each of the first frame body 51 and the second frame body 52, wherein the two permanent magnets 60 of the first frame body 51 are symmetrically arranged each other, and the two permanent magnets 60 of the second frame body 52 are symmetrically arranged each other. The permanent magnets 60 of the first frame body 52 and the permanent magnets 60 of the second frame body 52 are arranged in one-to-one correspondence, and an included angle formed by connection lines between the centers of every two permanent magnets 60 arranged in one-to-one correspondence and the axis of the output shaft 80 is 50°~60°. In one of embodiments, the included angle is 54°. The N pole of the permanent magnet 60 of the first frame body 51 is far away from the direction of the iron core 90, and the S pole is oriented to the direction of the iron core 90. The N pole of the permanent magnet 60 of the second frame body 52 is far away from the direction of the iron core 90, and the S pole is oriented to the direction of the iron core 90.

Further, a lower bearing 81 and an upper bearing 82 are mounted on the output shaft 80, the lower bearing 81 is located on the receiving seat 30, and the upper bearing 82 is located on the housing 40. Especially, the lower bearing 81 is accommodated in the first bearing groove 31, the upper bearing 82 is accommodated in the second bearing groove 41. The output shaft 80 can rotate at a high speed under the drive of the iron core 90 through the support action of the lower bearing 81 and the upper bearing 82.

Figure 11:
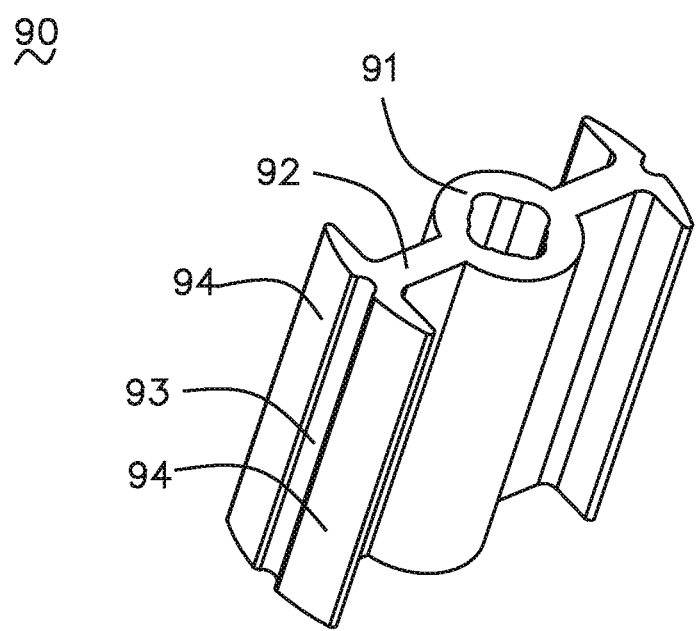

Further, referring to FIG. 11, the iron core 90 includes a sleeve portion 91 sleeved on the output shaft 80, swing arms 92 symmetrically arranged at two sides of the sleeve portion 91, and the swing arms 92 are arranged opposite to the permanent magnets 60. The swing arms 92 are set in T-shape as a whole. The swing arm 92 is provided with an arc-shaped groove 93 and two stress faces 94. The two stress faces 94 are symmetrically located at two sides of the arc-shaped groove 93 and in one-to-one correspondence to the permanent magnets 60. Because the stress face 94 is arc-shaped and has a large stress area, it easily transfers the magnetic force generated by the permanent magnet 60 to the output shaft 80.

When the miniature direct-current motor 10 is mounted, the output shaft 80 penetrated into the iron core 90, the first frame body 51 and the second frame body 52 are buckled to wrap the assembled iron core 90, the permanent magnets 60 are mounted on the first mounting groove 53 of the first frame body 51 and the second mounting groove 55 of the second frame body 52, and the coils 70 are wound on the first frame body 51 and the second frame body 52. Subsequently, the above components are integrally mounted in the housing 40, the lower bearing 81 and the upper bearing 82 are mounted on the output shaft 80, the receiving seat 30 is buckled, and the bottom cover 20 is finally covered.

The above miniature direct-current motor 10 includes a bottom cover 20, a receiving seat 30 mounted on the bottom cover 20, a housing 40 mounted on the receiving seat 30, a support frame 50 mounted in the housing 40, four permanent magnets 60 and coils 70 mounted on the support frame 50, an output shaft 80 mounted on the receiving seat 30 and extending out of the housing 40 and an iron core 90 mounted on the output shaft 80. When in use, by alternatively changing the current direction of the coil 70, the alternative change of the specific current direction is controlled by a control chip. The iron core 90 becomes a field core under the action of the magnetic field after electrification, and the iron core 90 swings left and right under the action of the magnetic field of the permanent magnet 60, so as to drive the output shaft 80 to swing left and right. Because the included angle formed by connection lines between the centers of two permanent magnets 60 on the same side of the support frame 50 and the axis of the output shaft 80 is 50°~60°, according to cosine law, the permanent magnet of the miniature direct-current motor is large in generating assisted force, enough in stress stroke and large in swing amplitude. It is unnecessary to make up for insufficient drive force in neutral position when circuit switching with the help of a reset spring during a time gap for change in current direction. The miniature direct-current motor is simple in structure and small in noise. When in working, the frequency of the miniature direct-current motor 10 is 300~500 HZ, and the shaking of the output shaft 80 can be as high as 30000~50000 times per minutes, which can allow toothpaste and water mixture in the mouth to generate a large amount of tiny bubbles so that the pressure generated when the bubbles are blown out can go deep into the teeth to clean the dirt, and the brushing effect is good.

The various technical features of the above embodiments can be arbitrarily combined. In order to make the description concise, all possible combinations of the various technical features of the above embodiments are not described. However, as long as the combinations of these technical features are not conflicted, all of them should be deem as falling within the scope of the specification.

The above embodiments only express several embodiments of the disclosure, the description of which is more specific and detailed, but it cannot be understood as limiting the scope of the invention patent. It should be noted that for those of ordinary skill in the art, several deformations and improvements can be also made without departing from the concept of the disclosure, which belong to the protective scope of the disclosure. Therefore, the protective scope of the invention patent shall be based on the appended claims.

What is claimed is:

1. A miniature direct-current motor, comprising a bottom cover, a receiving seat, a housing mounted on the receiving seat, a support frame mounted in the housing, four permanent magnets and a coil mounted on the support frame, an output shaft mounted on the receiving seat and extending out of the housing and an iron core mounted on the output shaft, wherein every two permanent magnets constitute one group and are symmetrically located on a side surface of the support frame, an included angle formed by connection lines between centers of two permanent magnets located on a same side surface of the support frame and an axis of the output shaft are 50°~60°; the iron core includes a sleeve portion sleeved on the output shaft and swing arms symmetrically arranged at two sides of the sleeve portion, and the swing arms are arranged opposite to the permanent magnets;

a lower bearing and an upper bearing are mounted on the output shaft, the lower bearing is located on the receiving seat, and the upper bearing is located on the housing; and the receiving seat is provided with a first bearing groove and two slots, the first bearing groove accommodates the lower bearing, and the two slots extend toward the bottom cover.

2. The miniature direct-current motor according to claim 1, wherein two fixture blocks are protruded from the bottom cover, and the fixture blocks are adaptive to the slots in one-to-one correspondence.

3. The miniature direct-current motor according to claim 1, wherein two arc-shaped blocks are protruded from the receiving seat, and the arc-shaped blocks are abutted against an inner wall of the housing.

4. A miniature direct-current motor, comprising a bottom cover, a receiving seat, a housing mounted on the receiving seat, a support frame mounted in the housing, four permanent magnets and a coil mounted on the support frame, an output shaft mounted on the receiving seat and extending out of the housing and an iron core mounted on the output shaft, wherein every two permanent magnets constitute one group and are symmetrically located on a side surface of the support frame an included angle formed by connection lines between centers of two permanent magnets located on a same side surface of the support frame and an axis of the output shaft are 50°~60°; the iron core includes a sleeve portion sleeved on the output shaft and swing arms symmetrically arranged at two sides of the sleeve portion, and the swing arms are arranged opposite to the permanent magnets; and an outgoing head of the coil penetrates out from the bottom cover.

5. The miniature direct-current motor according to claim 1, wherein the swing arm is provided with an arc-shaped groove and two stress faces, the two stress faces are symmetrically located at two sides of the arc-shaped groove and arranged in one-to-one correspondence to the permanent magnets.

6. A miniature direct-current motor, comprising a bottom cover, a receiving seat, a housing mounted on the receiving seat, a support frame mounted in the housing, four permanent magnets and a coil mounted on the support frame, an output shaft mounted on the receiving seat and extending out of the housing and an iron core mounted on the output shaft, wherein every two permanent magnets constitute one group and are symmetrically located on a side surface of the support frame an included angle formed by connection lines between centers of two permanent magnets located on a same side surface of the support frame and an axis of the output shaft are 50°~60°; the iron core includes a sleeve portion sleeved on the output shaft and swing arms symmetrically arranged at two sides of the sleeve portion, and the swing arms are arranged opposite to the permanent magnets; and the support frame comprises a first frame body and a second frame body, and one end of the first frame body and one end of the second frame body are abutted against the receiving seat.

7. The miniature direct-current motor according to claim 6, wherein the first frame body is provided with first mounting grooves and first coil wrapping grooves, and the first mounting grooves longitudinally extend to accommodate the permanent magnets, and the first coil wrapping grooves transversely extend to accommodate the coils.

8. The miniature direct-current motor according to claim 7, wherein the second frame body is provided with second mounting grooves and second coil wrapping grooves, the second mounting grooves longitudinally extend to accommodate the permanent magnets and are in one-to-one correspondence to the first mounting grooves, and the second coil wrapping grooves transversely extend to accommodate the coils and are in one-to-one correspondence to the first coil wrapping grooves.

\* \* \* \* \*